(12) United States Patent
Kjellman et al.

(10) Patent No.: US 6,873,095 B1
(45) Date of Patent: Mar. 29, 2005

(54) LIGHT SOURCE, AND A FIELD EMISSION CATHODE

(75) Inventors: Jan Kjellman, Anières (CH); Magnus Lindmark, Stockholm (SE)

(73) Assignee: NanoLight International Ltd., Aniere (CH)

( * ) Notice: Subject to any disclaimer, the term of this patent is extended or adjusted under 35 U.S.C. 154(b) by 45 days.

(21) Appl. No.: 10/031,838

(22) PCT Filed: Jul. 28, 2000

(86) PCT No.: PCT/SE00/01522

§ 371 (c)(1),
(2), (4) Date: May 28, 2002

(87) PCT Pub. No.: WO01/09914

PCT Pub. Date: Feb. 8, 2001

(30) Foreign Application Priority Data

Jul. 30, 1999 (SE) .......................... 9902823-5
Sep. 10, 1999 (SE) .......................... 9903226-0
Oct. 12, 1999 (SE) .......................... 9903662-6

(51) Int. Cl.⁷ .......................... H01J 1/16; H01J 19/10
(52) U.S. Cl. .................. 313/336; 313/346 R; 313/351; 313/309; 313/310; 313/311
(58) Field of Search ................................ 313/309, 310, 313/311, 336, 346 R, 351; 445/50, 51

(56) References Cited

U.S. PATENT DOCUMENTS

| | | | |
|---|---|---|---|
| 3,758,809 A | | 9/1973 | Menelly et al. |
| 4,818,914 A | | 4/1989 | Brodie |
| 5,371,431 A | * | 12/1994 | Jones et al. .................. 313/309 |
| 5,764,004 A | * | 6/1998 | Rabinowitz ............. 313/346 R |
| 5,773,834 A | | 6/1998 | Yamamoto et al. |
| 6,008,575 A | | 12/1999 | Kaftanov et al. |

FOREIGN PATENT DOCUMENTS

| | | |
|---|---|---|
| EP | 0 905 737 | 3/1999 |
| EP | 1022764 | 7/2000 |
| SE | 510 412 | 5/1999 |
| WO | 97/07531 | 2/1997 |
| WO | 98/21736 | 5/1998 |
| WO | 99/31701 | 6/1999 |

OTHER PUBLICATIONS

Chubin, N. et al. "Vacuum Fluorescent Light Source with Carbon Fibers Field Emission Cathode." *Eighth International Vacuum Microelectronics Conference Technical Digest.*(1995): 516–521.

Chakhovskoi, Andrei G. et al. "Phosphor selection constraints in application of gated field–emission microcathodes to flat panel displays." *J. Vac. Sci. Technol.*(Mar./Apr. 1994): 785–789.

* cited by examiner

*Primary Examiner*—Nimeshkumar D. Patel
*Assistant Examiner*—Shariene Leurig
(74) *Attorney, Agent, or Firm*—Renner, Otto, Boisselle & Sklar, LLP

(57) ABSTRACT

The light source, comprises an evacuated container having walls, including an outer glass layer (23) which on at least part thereof is coated on the inside with a layer of phosphor (24) forming a luminescent layer and a conductive layer (25) forming an anode. The phosphor (24) is excited to luminescence by electron bombardment from a field emission cathode (40) located in the interior of the container. The field emission cathode (40) comprises a carrier having a diameter in the mm range. At least a portion of the surface of the carrier is provided with a conductive layer having surface irregularities in the form of tips, having a radial extension being less than about 10 $\mu$m. Due to the geometry and the tips, the electric field is concentrated and amplified at the field emission surface.

49 Claims, 3 Drawing Sheets

LIGHT SOURCE, AND A FIELD EMISSION CATHODE

FIELD OF THE INVENTION

The present invention relates to a light source according to the introductory portion of claim 1, especially a light source for illumination. Further, the present invention relates to a field emission cathode according to the introductory portion of claim 21.

BACKGROUND OF THE INVENTION

One common type of light sources is the fluorescent tube. It has many advantages, but suffers from serious drawbacks. For example, there is always a delay after the power has been turned on until it starts to operate giving full light. It needs complicated control equipment, which requires space. To obtain light with a source of this kind it is unfortunately necessary to use materials having negative environmental effects. It is for example a big disadvantage that mercury has to be used in this type of light sources.

Cathodolumninescent light sources is another interesting type of light sources. Such light sources, including an evacuated envelope containing a grid and a heated cathode, for emission of electrons, are known from GB, A, 2 070 849 (The General Electric Company Limited), GB, A, 2 097 181 (The General Electric Company PLC), GB, A, 2 126 006 (The General Electric Company plc) and GB, A, 2 089 561 (The General Electric Company Limited). Be insides of the envelopes are covered with a layer of phosphor of an electron-responsive type. These cathodoluminescent lamps have essentially the form of an electric bulb.

Since these light sources all have a heated cathode, the cathode has to be heated by special means, before the emission of light starts.

The use of electrons exciting phosphor to luminescence has the effect that more heat is produced than in comparable fluorescent tubes. It is therefore advantageous if the active surface, for the emission of light and for the necessary heat dissipation, is large. The cathodoluminescent lamps shown in the documents mentioned do not have optimal surfaces. To overcome the drawbacks and problems with the fluorescent tubes and cathodoluminescent light sources, light sources having field emission cathodes were developed.

A light source of this kind is disclosed in U.S. Pat. No. 5,588,893 (Kentucky Research and Investment Company Limited). A field emission cathode is arranged inside an evacuated glass container having a luminescent layer arranged on its inner surface. A modulator or extraction electrode is provided between the cathode and the luminescent layer. The cathode includes carbon fibers, arranged in bundles, preferably in a matrix, on a substrate. The content of U.S. Pat. No. 5,588,893 is incorporated herein by reference.

However in the last-mentioned known light source, electrons are emitted only in a direction perpendicular to the substrate. Also, there is no indication in the document how to produce the light source in a cost-efficient way.

The above mentioned U.S. Pat. No. 5,588,893 (Kentucky Research and Investment Company Limited) also discloses a field emission cathode of the kind mentioned above. The cathode disclosed includes carbon fibres, arranged in bundles, preferably in a matrix, on a substrate. The document also discloses a method including treatment of the emitting surfaces in order to achieve a cathode with higher efficiency than previous cathodes.

Further, WO, A1, 98/57344 (LightLab AB) and WO, A1, 98/57345 (LightLab AB) disclose light sources having cylindrical geometry and employing field emission. In order to obtain the necessary electric field for field emission, the mentioned light sources include grids or modulator electrodes arranged close to the field emitting surfaces of the cathodes. In those light sources a relatively high electric field has to be created between the cathode and the grid, and the distance between the field emitting surfaces and the grid has to be small and uniform in order to achieve a sufficient electric field for field emission and good distribution of electrons emitted from the cathode.

A further document, WO, A1, 97/07531 (Silzars et. al.) discloses a lighting apparatus including a field emission cathode. The cathode is built up of one or more fibers. The fibers are very thin, having a diameter less than 100 microns, and preferably less than 10 microns. The diameters are selected in order to achieve field emission at reasonable voltages. A construction according to this document having one fiber will be inoperative if the fiber is broken. Since the fiber is very thin, the probability of that it breaks appears to be high. However, the probability is probably somewhat lowered by arranging more than one fiber in parallel, for redundancy. Moreover, the electron emission surface is very small due to the small diameter of the fiber(s).

Previously known field emission cathodes are often of a complicated and fragile construction, especially as concerns the mountings and the attachment of field emitting bodies.

It has been found in connection with cathodes including standard carbon fibers and a grid that the electrical fields acting between the cathode and a grid or an anode can cause individual fibers to get loose from their carrier if they are not safely secured thereto. Once loose, the fibers will, in most cases, be attracted by the grid and cause a short circuit between the cathode and the grid, until it burns off after some time due to the resulting current through the fibres.

SUMMARY OF THE INVENTION

It is an object of the invention to provide a light source and a field emission cathode, respectively, providing a concentrated electric field at the field emission surface(s), and by which at least some of the drawbacks above are eliminated or reduced.

These and other objects are attained by the features set forth in the appended independent claims.

By the features in claims 1, 12 and 34, 47, it is achieved a light source, a field emission cathode and an alternative light source and field emission cathode, respectively, having a long life, with high efficiency and stability, which can be produced at low cost.

By the features in claims 1, 12 and 34, 47, it is achieved a light source, a field emission cathode and an alternative light source and field emission cathode, respectively, having a sufficient electric field for field emission with good distribution and high emission of electrons from the cathode.

By the features in claims 1, 12 and 34, 47, it is achieved a light source, a field emission cathode and an alternative light source and field emission cathode, respectively, in which field emission can be obtained without the use of a grid or extraction electrode.

By the features in claim 1, further, a light source without a starting up period is achieved, i.e. when the power is turned on, the light starts immediately, thanks to the use of a field emission cathode. A light source with no need for materials having negative environmental effects is also achieved.

By the features in claims 1 and 34, further, a light source having a field emitting cathode of simple and robust construction is obtained.

By the features in claim 5, further, a light source having a large active light emitting surface is achieved. This efficient use of the surface renders it possible to achieve a light source having a high light emission in relation to the heat produced.

By the features in claims 21 and 47, further, a field emitting cathode of simple and robust construction is obtained.

By the features in claims 21 through 33 and claims 47 through 54 a field emitting cathode is obtained which further provides for a high emission and uniform distribution of emitted electrons, in particular through a cylindrical surface region surrounding the cathode. A cathode with low interference between the field emitting surfaces is also achieved.

Further features and advantages will be apparent from the dependent claims and the detailed description below.

DESCRIPTION OF THE PREFERRED EMBODIMENTS

Figure 1:
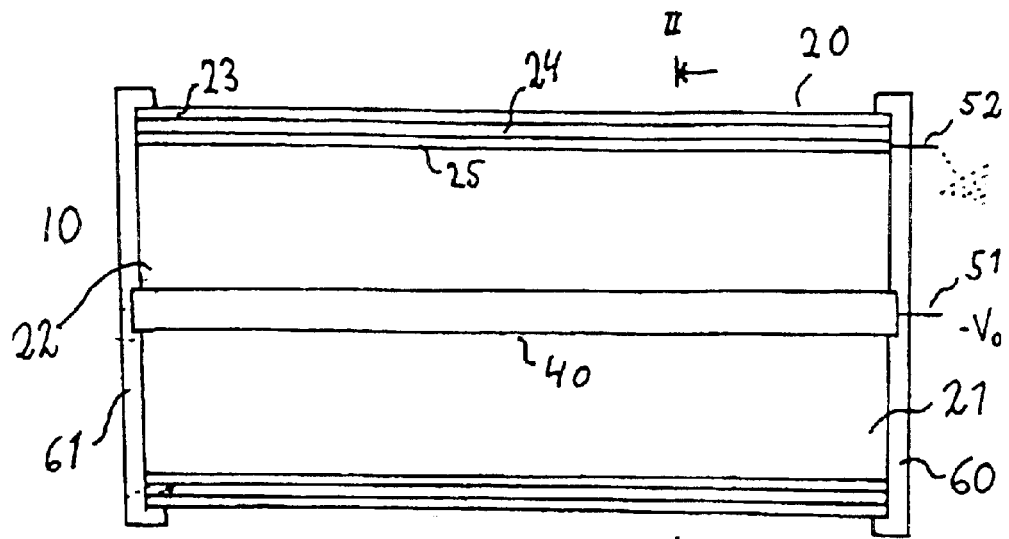
FIG. 1 shows schematically a longitudinal section of an embodiment of a light source according to the present invention.

Referring to FIG. 1, there is shown, in a schematic longitudinal section, an embodiment of a light source according to the present invention, identified generally by the numeral 10, and especially intended for illumination purposes. It includes a container having walls, one of which is identified by the numeral 20. This wall 20 has an outer glass layer and is shown to be cylindrical. The cylinder 20 has an end 21, which is covered by an end cap 60. A sealing (not shown) is provided between the end cap and the cylinder 20, in order to achieve an airtight sealing of the container. At the other end 22 of the cylinder 20 an end cap 61 is provided, similar to the one arranged at the end 21, also provided with a sealing. Alternatively, at the end 22 there can be arranged a circular wall as a continuation of the cylinder wall 20, also having an outer layer of glass. The container is sealed in order to maintain the vacuum (approximately $10^{-6}$ torr) created when the container is evacuated.

Inside the container and preferably coaxially therewith, a cathode 40 is arranged. This cathode is a cold cathode, especially a field emission cathode. Its construction and function will be explained further below.

The light source is provided with electrical connections 51, 52, and means (not shown) for fastening of the cathode 40. The cathode 40 can be soldered to the caps 60, 61 or it can be adhered to the caps 60, 61 by an adhesive, preferably an electrically conducting adhesive. It could also be clamped to the caps 60, 61 by clamping means or gripped by gripping means. It is also possible that a circular wall, which is a continuation of the cylinder wall 20, is provided with supporting, fastening or gripping means.

The cylindrical part 20 of the container walls surrounding the cathode 40 consists of an outer glass layer 23, a phosphor layer 24 (a cathodoluminescent phosphor) and an inner conductive layer 25 forming an anode. The phosphor layer is a luminescent layer, which upon electron bombardment emits visible light. The anode is preferably made of a reflecting, electrically conductive material, e.g. aluminum. By arranging an aluminum layer covering the phosphor layer, adverse effects on the vacuum by possible evaporation of the phosphor are avoided.

The electrical connection means 51, 52 connect the cathode 40 and the anode 25, respectively, to a feed and control circuit (not shown). Those connection means preferably include conductive terminal pins which extend through the cap 60 and are insulated from each other. The electrical connection means 52 could further include conductive fingers or similar, which are in contact with the anode layer 25 provided inside the container. The openings for the electrical connection means 51, 52 in the end cap 60 are airtight sealed. At the other end 22 of the container wall 20, there can be arranged an end cap 61 similar to the end cap 60, to support the cathode 40. However, this end cap 61, at the other end 22, could be formed without electrical connection means.

The cathode 40 includes a relatively thin wire or rod, of electrically conductive material, e.g. a nickel wire. The wire or rod preferably has a circular cross section and its diameter is in the millimeter range, about one to a few mm, e.g. 0.5–5 mm or 1.5–2 mm. This provides for a strong and durable cathode, exhibiting a surface sufficient for a high emission of electrons. The area of the wire is also sufficient for the current to be conducted there through.

Figure 2:
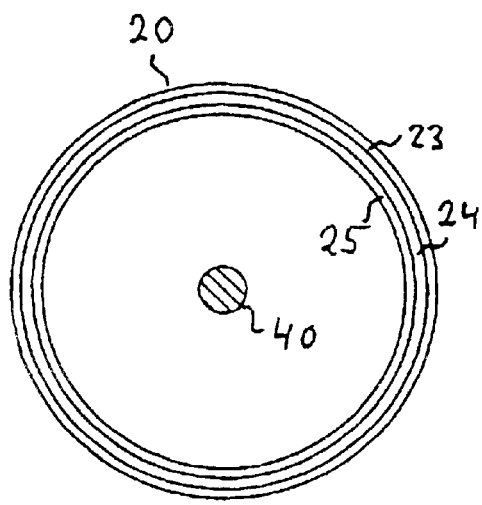
FIG. 2 shows schematically a cross section taken at II—II in FIG. 1.

FIG. 2 shows the light source of FIG. 1 in a cross section taken at II—II.

In operation, a DC voltage is supplied between the cathode 40 and the anode 25 by means of a feed and control circuit (not shown), which could be located in a housing, connected to the AC mains e.g. through an ordinary lamp socket. The feed and control circuit supplies the voltages to the conductive terminal connections 51–52, to which it is connected. Preferably connection 52 is at ground potential and connection 51 is negative. When the voltage is applied, an electrical field is created between the cathode 40 and the anode 25.

Figure 3:
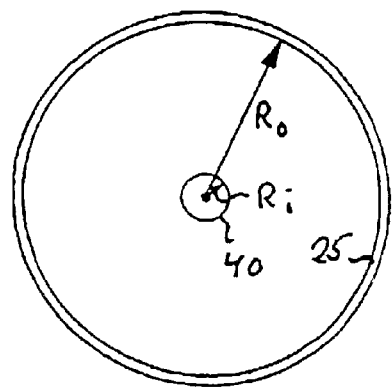
FIG. 3 shows schematically the cathode and the anode of FIG. 2.

Due to the geometry of the light source according to the invention a favorable distribution of the electric field is obtained. The electric field is strongest where a strong electric field is needed, for obtaining field emission, namely around the cathode. The following formula gives the electric field strength in a structure according the invention, having a central conductor coaxially surrounded by a circular cylindrical conductor:

$$E(r) = \frac{V_0}{\ln\frac{R_o}{R_i}} \cdot \frac{1}{r},$$

where E(r) is the electric field strength at radius r with respect to the central axis of the central conductor, $V_0$ is the voltage applied between the conductors (cathode and anode in the light source), $R_o$ is the inner radius of the cylindrical conductor (the anode) and $R_i$ is the outer radius of the inner conductor (the cathode). In FIG. 3, which schematically shows the cathode and the anode of FIG. 2, variables of the formula are indicated. As seen from the formula a very strong electric field close to the cathode can be obtained with suitably selected dimensions. Especially a small radius of the cathode (small r) will give a high electric field close to the cathode. The electric field lines will be concentrated around the cathode, and it can be seen as if the cathode were surrounded by a virtual extraction electrode.

In order to obtain field emission from the cathode, it is covered with a field emitting material, such as a layer of carbon nanotubes. The electric field is then further amplified around the field emitting tips, and an amplification factor (of the field) of 1000 and even more can be obtained. This can be seen as an amplification of the effect of said virtual extraction electrode. Taking this amplification factor (about 1000) into account, the electric field needed to efficiently extract electrons (by field emission) from a layer of nanotubes is about 1 kV/mm. For further explanation and discussion of nanotubes it is referred to the articles "Field emission from carbon nanotubes: a comparative study" by J M Bonard, J P Salvetat, T Stöckli, L Forró, A Châtelain, Proceedings of the 193$^{rd}$ ECS sumposium, 1998, and "Field emission properties of multiwalled carbon nanotubes" by J M Bonard, F Maier, T Stöckli, A Châtelain, W A de Heer, J P Salvetat, L Forró, Ultramicroscopy 73 (1998) 7–15, which articles are incorporated herein by reference.

The irregularities are formed by carbon nanotubes applied on the (cylindrical) surface of the wire or rod included in the cathode. The nanotubes have a very short length, less than about 10 μm, and do not affect the variable r in the formula since the diameter of the wire or rod of the cathode is selected in the mm range, about one to a few mm, e.g. 0.5–5 mm or 1.5–2 mm. The tips of the nanotubes have a radius of curvature being in the range 0.1–100 nanometers.

The applied carbon nanotubes can be of different types, e.g. single wall nanotubes or open or closed multi wall nanotubes. In this case catalytically deposited multi wall nanotubes deposited in the form of a film are suitable and can be applied by a simple process. Such nanotubes are suitable for depositing on a wire and they will be appropriately oriented by the process, with their respective longitudinal axis being essentially perpendicular to the longitudinal axis of the wire. Further, application of nanotubes by a catalytic or alternatively CVD process results in good uniformity and low manufacturing cost. Recent laboratory measurements confirm that the amplification factor is about 1000 in catalytically deposited nanotube films and that currents up to 10 mA/cm$^2$ are obtained.

When the field strength is sufficient to cause field emission of electrons from the field emitting surfaces (tips) of the field emitting material (nanotubes) of the cathode 40, the electrons will accelerate and travel towards the anode 25. Due to the high kinetic energy of the electrons and the fact that the anode layer is relatively thin (less than 0.1 micron), the electrons will pass through the anode so as to enter the phosphor layer while still having sufficient kinetic energy to excite the phosphor to luminescence, whereby visible light is emitted. The electrons will then return to the anode to be drained off. The electron bombardment will cause, besides light, heating of the cylinder wall 20. The glass layer will provide for the dissipation of the heat. The voltage is in the range of kV, typically about 4–8 kV. The voltage much depends on the type of phosphor used. New types of phosphor are continuously developed and because of that, the voltage must be adapted to the specific type of phosphor used. Changing the type of phosphor and thereby the voltages will cause changes in the currents and the heating of the cylinder wall.

If for example a phosphor layer 24 which needs to be bombarded with electrons of about 8 kV in order to obtain a good efficiency, and the cathode 40 has a diameter of about 1 mm in order to assure that the nanotube layer has a sufficiently big surface to emit the current needed for high light intensity, the above formula gives an electric field of 4 kV/mm at the cathode surface with an inner diameter of the anode 25 being 55 mm. With a cathode diameter of 1.5 mm, 3.7 kV/mm is obtained at the cathode surface if the inner diameter of the anode 25 is 28 mm. A field strength of about 4 kV/mm has been chosen in these examples to be safely above the 1 kV/mm needed.

For the example above with a cathode diameter of 1.5 mm and an inner diameter of the anode being 28 mm, a length of 20 mm (anode and cathode) gives an electron emission surface of about 1 cm$^2$. From this surface electrons corresponding to a current of 10 mA can be emitted. The corresponding phosphor surface is about 20 cm$^2$, which thus gives a current density of 0.5 mA/cm$^2$ at the phosphor surface. This is a too high density for continuous operation (for a high voltage of 8 kV, this corresponds to 80 W for a 20 mm long cylinder lamp).

With a light source according to the invention there is thus no problem to obtain currents, and consequently light intensities well corresponding to what is obtained from a classical fluorescent light tube. As seen from the examples the outer diameter of a light source according to the invention can be made to correspond well to that of a classical fluorescent light tube. As apparent from the description, the light source according to the invention starts to emit light immediately, when a voltage is applied between the anode and the cathode.

Due to the geometry of the light source according to the invention, the dimensional tolerances are not required to be very exact, especially in comparison to light sources having a grid. This is apparent from the formula above, and contributes to low manufacturing costs.

Figure 4:
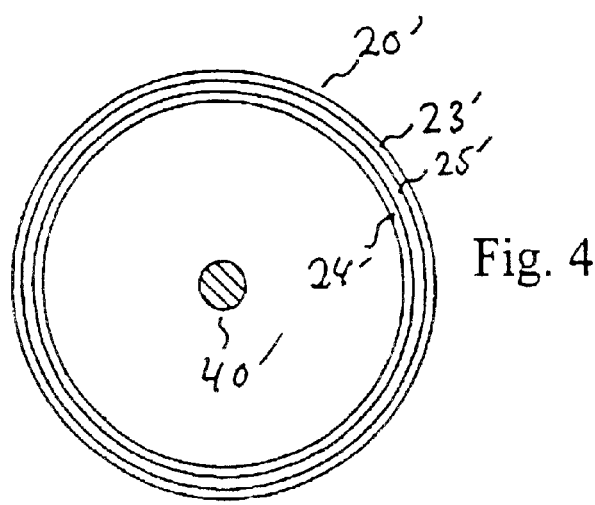
FIG. 4 shows schematically a cross section of an alternative embodiment of a light source according to the present invention.

FIG. 4 shows an alternative embodiment of a light source, according to the invention, in cross section. What differs from FIG. 2 is the arrangement of the layers of the wall 20'. It includes an outer glass layer 23', which is covered, on at least a major part of its inside, by an electrically conductive transparent material forming the anode 25'. The anode 25' then carries the phosphor layer 24' on the inside. The anode is made from e.g. ITO (indium tin oxide). To establish direct electrical contact with the anode 25', conductive fingers can be arranged as mentioned above and some regions of the anode 25' are therefore not covered with phosphor. Alternatively, electrically conductive surfaces being in contact with the anode can be applied on to the phosphor layer. Those surfaces are small not to interfere with the operation of the light source but of sufficient size to establish electrical contact with the conductive fingers.

The operation of this embodiment illustrated in FIG. 4 is essentially the same as that of the embodiment illustrated in FIG. 2. However, after leaving the cathode 40, the electrons will first hit the phosphor layer and excite it to luminescence, and thereafter they will be drained off by the anode. Since the electrons first hit the phosphor layer and do not have to pass through the anode layer before they hit the phosphor layer, the voltage applied between the cathode and the anode can be about 1–2 kV lower than in the embodiment illustrated in FIG. 2.

Figure 5:
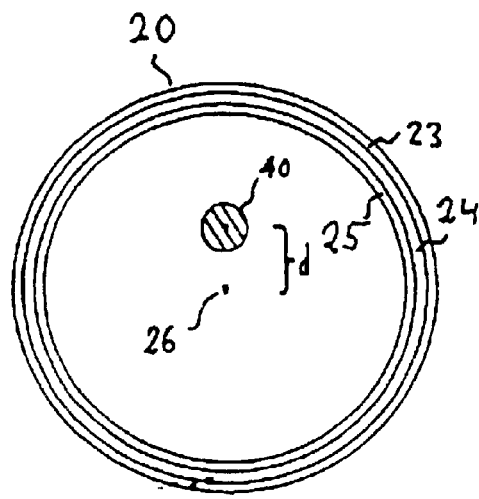
FIG. 5 shows schematically a cross section of a further alternative embodiment of a light source according to the present invention.

In the previous embodiments, the cathode 40 has been shown to be arranged concentrically with the container wall 20. However, it can be non-concentrically arranged as shown in FIG. 5. Here the center of the cathode 40 is located at a distance d from the center 26 of the cylindrical container wall 20. By this arrangement, the electric field will be increased at portions of the container and decreased in other portions. Hereby a possibility to control the light intensity is obtained, so that increased light intensities can be achieved in certain directions. However, the electric filed around the cathode, the extraction field, will not be substantially changed due to the non-concentricity for moderate distances d. If the inner diameter of the cylinder wall 20 is 20 mm and the outer diameter of the cathode is 2 mm, a distance d of 5 mm will cause higher current densities at the portions of the cylinder wall closest to the cathode 40, but the electric field around the cathode will still be sufficient for filed emission around the cathode 40. For small distances d (e.g. around 0.1 mm) the effects are almost none. This means that exact concentricity is not necessary for obtaining homogenous light emission.

Figure 6:
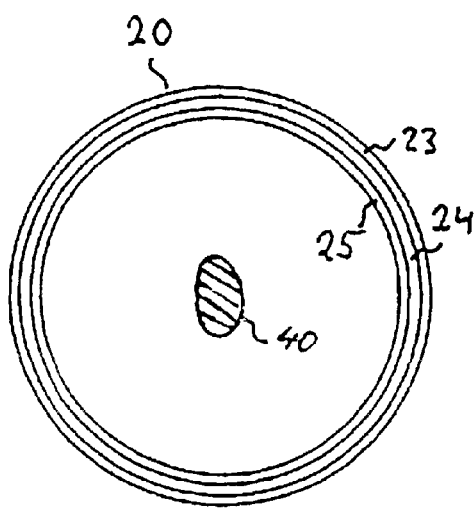
FIG. 6 shows schematically a cross section of a yet further alternative embodiment of a light source according to the present invention.

In FIG. 6, a further embodiment of the invention is shown, where the cathode 40, i.e. the carrier (wire or rod) of the surface irregularities (the nanotubes), have a non-circular cross section. The cross section shown is elliptical, but could be any, having a smooth curve, i.e. not exhibiting any sharp corners. In this case the electric filed, the current densities and the light intensities can be controlled in a similar manner as in the previous embodiment of FIG. 5.

Figure 7:
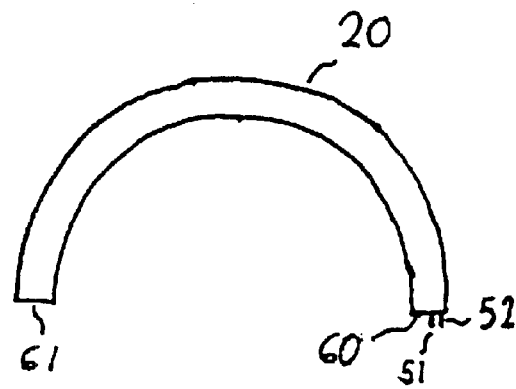
FIG. 7 shows schematically a possible shape of a light source according to the present invention.

In earlier embodiments the container has been shown to be a straight cylinder. However other shapes are possible. In FIG. 7 a container having the shape of a bent tube, is shown. The tube can be bent in a circular form or semi-circular, as shown.

Since nanotubes are conductive the core or carrier (the wire or rod) of the cathode 40 does not have to be conductive. It can be made of a semi-conductive or an isolating material. In such a case the nanotubes are applied in a continuous layer, and electrical connections are provided to this layer. This is valid for all previous embodiments.

Figure 8:
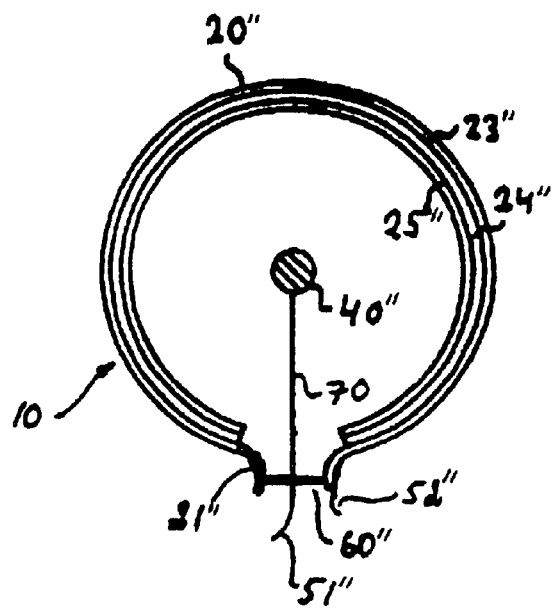
FIG. 8 shows schematically a longitudinal section of another alternative embodiment of a light source according to the present invention.
Figure 9:
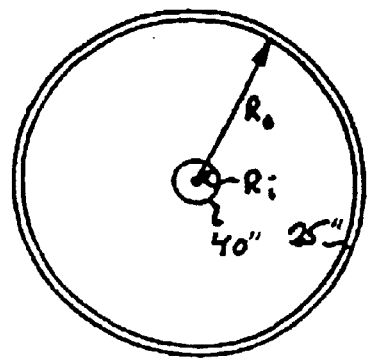
FIG. 9 shows schematically the cathode and the anode as disclosed in FIG. 8.

In the alternative arrangement disclosed in FIG. 8 the wall 20" has an outer glass structure and is shown to be spherical. The sphere 20" has an end 21" which is covered by an end cap 60". A sealing (not shown) is provided between the end cap and the sphere 20", in order to achieve an airtight sealing of the container. Also here the container is sealed in order to maintain the vacuum (approximately $10^{-6}$ torr) created when the container is evacuated.

Inside the container and preferably centrically therewith, a cathode 40" is arranged. The cathode 40" includes a relatively small sphere of electrically conductive, electrically semi-conductive or insulating material, e.g. of nickel. The radius thereof is in the millimeter range, about one to ten mm. This provides for a strong and durable cathode, exhibiting a surface sufficient for a high emission of electrons. Also in this case the cathode is a cold cathode, especially a filed emission cathode. Its construction and function will be explained further below.

The light source is provided with electrical connections 51", 52", and means 70 for supporting of the cathode 40". Said means 70 takes the form of a thin conducting rod 70 extending to the end cap 60". The rod 70 could be clamped to the cap 60" by clamping means or gripped by gripping means.

The spherical part 20" of the container walls surrounding the cathode 40" consists of an outer glass structure 23", a phosphor layer 24" (a cathodoluminescent phosphor) and an inner conductive layer 25" forming an anode. The phosphor layer is a luminescent layer, which upon electron bombardment emits visible light. The anode is preferably made of a reflecting, electrically conductive material, e.g. aluminum. By arranging an aluminum layer covering the phosphor layer, adverse effects on the vacuum by possible evaporation of the phosphor are avoided.

The electrical connection means 51", 52" connect the cathode 40" and the anode 25", respectively, to a feed circuit (not shown). Those connection means preferably include conductive terminal pins which extend through the cap 60" and are insulated from each other. The electrical connection means 52" could further include conductive fingers or similar, which are in contact with the anode layer 25" provided inside the container. The openings for the electrical connection means 51", 52" in the end cap 60" are airtight sealed.

In order to specify an example the case is taken where the outside sphere has a radius of about 30 mm, which is similar to a standard incandescent bulb: If the inner radius is chosen to be 2.5 mm, the electric field strength at the surface of the inner sphere will be 3500 V/mm for an applied voltage of 8000 volts. It is easy to draw a current of say 5 mA from the nanotube layer on the surface of the inner sphere (0.8 cm$^2$), which at the phosphor layer on the surface of the outer sphere (110 cm$^2$) will give a current density of about 45 microamps/cm$^2$.

The above calculations are given as examples for a perfect spherical symmetry. In reality one must of course take into consideration the fact that the central sphere is held in place by a thin conducting rod and that the outer sphere has an extension to the socket (compare FIGS. 8, 10 and 11).

Figure 10:
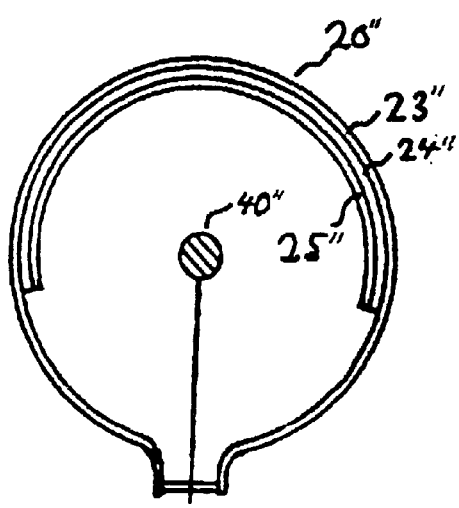
FIG. 10 shows schematically a longitudinal section of yey another alternative embodiment of a light source according to the present invention.
Figure 11:
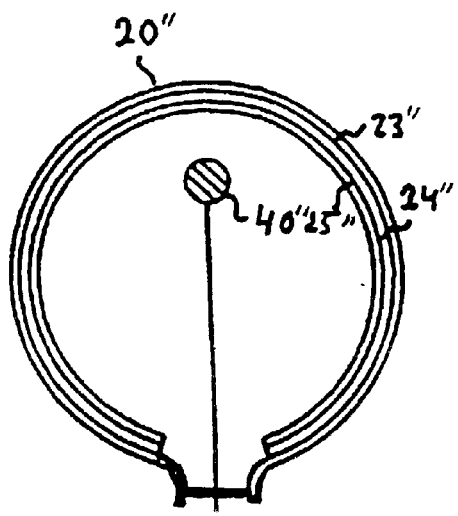
FIG. 11 shows schematically a longitudinal section of a further alternative embodiment of a light source according to the present invention.

Additionally, one can also consider cases where not the whole surface of the inner sphere is covered with phosphor, as is disclosed in the embodiment of FIG. 10.

Furthermore it is also possible to move the inner sphere to a non-central position in the outer sphere in order to increase the light intensity in certain directions. This follows from the embodiment disclosed in FIG. 11. According to an alternative arrangement, not disclosed on the drawing, the glass sphere could be covered, on at least a major part of its inside, by an electrically conductive transparent material forming the anode. The anode then carries a phosphor layer on the inside. The anode is made from e.g. indium-tin-oxide or indium oxide. To establish direct electrical contact with the anode conductive fingers can be arranged as mentioned above and some regions of the anode are therefore not covered with phosphor. Alternatively, electrically conductive surfaces being in contact with the anode can be applied on to the phosphor layer. Those surfaces are small not to interfere with the operation of the light source but of sufficient size to establish electrical contact with the conductive fingers.

In order to reduce existing disturbances of the electrical field within the container it may also be of advantage to encase the electrically conducting rod holding the inner sphere, within a separate casing. Such casing then takes the form of a grounded metallic cylinder.

Finally it should also be noted that the lamp bulb and the central bead could also be shaped differently from a sphere, e.g. like an ellipsoid, in order to influence the light distribution in different directions.

Although the invention is described by way of the above examples, naturally, a skilled person would appreciate that many other variations than those explicitly disclosed are possible within the scope of the claims.

Although the embodiments include certain details for the electrical connection and for the support of the different parts in the light source, it should be noted that they can be formed in many other ways, as should also be understood by a person skilled in the art, and that they do not limit the scope of invention.

What is claimed is:

1. A light source, comprising an evacuated container having a cylindrical shape, a diameter in the range of about 8–80 mm, and walls, at least a portion of which comprises an outer glass layer which on at least part thereof is coated on the inside with a layer of phosphor forming a luminescent layer, and a conductive layer forming an anode, which layer of phosphor is excited to luminescence by electron bombardment from a field emission cathode located in the interior of the container, wherein the field emission cathode comprises an elongate wire-shaped carrier having a cylindrical surface and a first longitudinal axis, and at least a portion of said cylindrical surface is provided with conductive surface irregularities in the form of carbon nanotubes, each having a second longitudinal axis being essentially perpendicular to the first longitudinal axis, and free ends of said nanotubes forming tips having a radial extension less than about 10 $\mu$m.

2. The light source according to claim 1, wherein the cylindrical surface has a diameter in the range of 0.5–5 mm.

3. The light source according to claim 1, wherein the elongate carrier is made of a conductive material.

4. The light source according to claim 1, wherein the elongate carrier is made of a semi-conductive material.

5. The light source according to claim 1, wherein the elongate carrier is made of an insulating material.

6. The light source according to claim 1, wherein the elongate carrier is coaxially arranged in the container.

7. The light source according to claim 1, wherein the elongate carrier is eccentrically arranged in the container.

8. The light source according to claim 1, wherein the elongate carrier has an essentially circular cross section.

9. The light source according to claim 1, wherein the elongate carrier has a non-circular cross section with a smooth curve.

10. The light source according to claim 1, wherein the elongate carrier comprises a wire.

11. The light source according to claim 1, wherein the elongate carrier comprises a rod.

12. The light source according to claim 1, wherein the tips have a radius of curvature being in the range 0.1–100 nanometers.

13. The light source according to claim 12, wherein said nanotubes are arranged on the carrier in the form of a deposited nanotube film.

14. The light source according to claim 1, wherein the tips are essentially uniformly distributed around the carrier.

15. The light source according to claim 1, wherein the luminescent layer is arranged between the glass layer and the anode, and the anode is made of a reflective material for reflection of the light emitted from the luminescent layer.

16. The light source according to claim 1, wherein the anode is arranged between the glass layer and the luminescent layer, and the anode is made of a transparent material.

17. The light source according to claim 1, wherein the phosphor layer is formed by a conductive phosphor and the phosphor layer also forms the anode.

18. The light source according to claim 1, wherein the container has the shape of a curved tube.

19. A field emission cathode, for use in a light source, and to be at least partially encompassed by an anode having a cylindrical shape and a diameter in the range of about 8–80 mm, and comprising an elongate electrically conductive element, characterized in that said elongate electrically conductive element has the form of a cylindrical surface having a first longitudinal axis, and at least a portion of said cylindrical surface being provided with conductive surface irregularities in the form of carbon nanotubes, each having a second longitudinal axis being essentially perpendicular to the first longitudinal axis, free ends of said nanotubes forming tips having a radial extension less than about 10 $\mu$m.

20. The field emission cathode according to claim 19, wherein the elongate wire-shaped carrier is made of a conductive material.

21. The field emission cathode according to claim 19, wherein the elongate wire-shaped carrier is made of a semi-conductive material.

22. The field emission cathode according to claim 19, wherein the elongate wire-shaped carrier is made of an insulating material.

23. The field emission cathode according to claim 19, wherein the elongate carrier has an essentially circular cross section.

24. The field emission cathode according to claim 19, wherein the elongate carrier has a non-circular cross section with a smooth curve.

25. The field emission cathode according to claim 19, wherein the elongate carrier comprises a wire.

26. The field emission cathode according to claim 19, wherein the elongate carrier comprises a rod.

27. The field emission cathode according to claim 19, wherein the tips have a radius of curvature being in the range 0.1–100 nanometers.

28. The field emission cathode according to claim 19, wherein said nanotubes are arranged on the carrier in the form of a deposited nanotube film.

29. The field emission cathode according to claim 19, wherein the tips are essentially uniformly distributed around the carrier.

30. A light source, comprising an evacuated container having walls, at least a portion of which comprises an outer glass structure which on at least part thereof is coated on the inside with a layer of phosphor forming a luminescent layer, and a conductive layer forming an anode, which layer of phosphor is excited to luminescence by electron bombardment from a field emission cathode located in the interior of the container, wherein the field emission cathode comprises a carrier, at least partly taking the form of a sphere, and at least a portion of the surface of said sphere is provided with conductive surface irregularities in the form of carbon nanotubes, each having a longitudinal axis being essentially perpendicular to the surface of the carrier, the free ends of said nanotubes forming tips having a radial extension less than about 10 μm.

31. The light source according to claim 30, wherein said carrier is made of a conductive material.

32. The light source according to claim 30, wherein said carrier is made of a semi-conductive material.

33. The light source according to claim 30, wherein said carrier is made of an insulating material.

34. The light source according to claim 30, wherein the container at least partly takes the form of a sphere having a radius within the range of 1–10 cm.

35. The light source according to claim 30, wherein the carrier is arranged in the center of the container.

36. The light source according to claim 30, wherein the carrier is eccentrically arranged in the container.

37. The light source according to claim 30, wherein the tips have a radius of curvature being in the range 0.1–100 nanometers.

38. The light source according to claim 30, wherein the tips are essentially uniformly distributed on said portion and the surface of said sphere being provided with surface irregularities.

39. The light source according to claim 30, wherein the luminescent layer is arranged between the glass structure and the anode, and the anode is made of a reflective material for reflection of the light emitted from the luminescent layer.

40. The light source according to claim 30, wherein the anode is arranged between the glass structure and the luminescent layer, and the anode is made of a transparent material.

41. The light source according to claim 30, wherein the phosphor layer is formed by a conductive phosphor and the phosphor layer also forms the anode.

42. A field emission cathode, for use in a light source, and to be at least partially encompassed by an anode, and comprising conductive surface irregularities in the form of carbon nanotubes, each being provided on at least a portion of a carrier including a spherical surface and having a longitudinal axis being essentially perpendicular to the surface of the carrier, and the free ends of said nanotubes forming tips having a radial extension less that about 10 μm.

43. The field emission cathode according to claim 42, wherein said carrier is made of a conductive material.

44. The field emission cathode according to claim 42, wherein said carrier is made of a semi-conductive material.

45. The field emission cathode according to claim 42, wherein said carrier is made of an insulating material.

46. The field emission cathode according to claim 42, wherein the cathode is to be at least partially encompassed by an anode at least partly taking the form of a sphere having a radius within the range of 1–10 cm.

47. The field emission cathode according to claim 42, wherein the tips have a radius of curvature being in the range 0.1–100 nanometers.

48. The field emission cathode according to claim 42, wherein the tips are essentially uniformly distributed on said portion and the surface of said sphere being provided with surface irregularities.

49. The light source according to claim 18, wherein the shape of the curved tube is curved in a circular or semicircular curve.

* * * * *